March 8, 1960

J. W. DOBKINS

2,927,485

MACHINE FOR BLOCKING SCREW THREADS

Filed May 3, 1957

INVENTOR.
JOE W. DOBKINS
BY
ATTORNEYS

March 8, 1960   J. W. DOBKINS   2,927,485
MACHINE FOR BLOCKING SCREW THREADS
Filed May 3, 1957   6 Sheets-Sheet 2

FIG 2

INVENTOR.
JOE W. DOBKINS
BY *Lyon & Lyon*
ATTORNEYS

March 8, 1960

J. W. DOBKINS 2,927,485

MACHINE FOR BLOCKING SCREW THREADS

Filed May 3, 1957

INVENTOR.
JOE W. DOBKINS
BY
ATTORNEYS

FIG. 5

INVENTOR.
JOE W. DOBKINS
BY
Lyon & Lyon
ATTORNEYS

FIG 6

United States Patent Office 2,927,485
Patented Mar. 8, 1960

2,927,485
MACHINE FOR BLOCKING SCREW THREADS

Joe W. Dobkins, Fort Worth, Tex., assignor, by mesne assignments, to Welex, Inc., Fort Worth, Tex., a corporation of Delaware Application May 3, 1957, Serial No. 656,971

7 Claims. (Cl. 77—3)

This invention relates to a machine for blocking screw threads, that is for removing or cutting away a portion of a screw thread, usually for the purpose of squaring the end of the thread to improve the strength of the thread. More particularly the invention relates to a machine for blocking the terminal end of the thread of an internally helically threaded tubular member such as the tubular portion of a hollow carrier shaped charge gun used in the perforation of oil wells.

In hollow carriers for shaped charge well perforating guns of the type shown generally in U.S. Patent No. 2,764,937 issued October 2, 1956, M. Schlumberger, for "Apparatus for Perforating Well Casings by Means of Shaped Charges," the hollow carrier includes an elongated cylindrical tube portion internally threaded at the ends to receive correspondingly threaded end closure members or plugs. The internal thread of the tube portion is cut in a lathe and the thread at its outer end merges into a shoulder disposed at right angles to the axis of the thread. The outer terminal portion of the thread where it merges into the transverse shoulder tapers from full width to a very thin knife edge adjacent the shoulder. The thread as so machined is extremely weak in its terminal portion and is easily damaged, as for example, when it is attempted to insert a screw plug therein.

Heretofore, it has been customary to remove the thin terminal portion of the thread, which extends for approximately one-half a revolution of the thread, with hand tools so that the thread initiates in full width. The hand work involved is tedious and costly, and necessarily produces non-uniform results.

It is therefore an object of the present invention to provide a machine for blocking the thread of a screw threaded member such as the hereinbefore described internally helically threaded tubular gun body.

Another object of the invention is to provide a machine of this type that will remove the tapered terminal portion of a screw thread in a rapid, efficient and uniform manner with simplicity and economy.

Another object of the invention is to provide a machine of this type for removing the tapered end of a screw thread so that the thread initiates in full width and has maximum strength. The squared, full width end of the thread so produced acts as a plow to clean the thread groove into which it is screwed. In contrast, if the tapered terminal end of the thread were not blocked off, any dirt or foreign matter in the groove would be forced into the tapered space between the mating threads and would interfere with proper thread engagement.

A further object of the invention is to provide a machine of the foregoing characteristics that is relatively simple and economical to manufacture and that is rugged in operation, thus having an extended service life in which a minimum of maintenance is required.

Still another object of the invention is to provide in a machine tool having a reciprocating cutting tool and wherein the work is continuously fed to the cutting zone defined by the reciprocating cutting tool in a direction transverse to the direction of reciprocation of the cutting tool, a construction whereby the cutting tool can reciprocate freely on both its cutting and return strokes without binding on the return stroke against the continuously advancing edge of the cut made in the work on the immediately preceding cutting stroke.

The foregoing, and other aims, objects and advantages of the invention, as will more fully appear hereinafter, are achieved in a machine for blocking the thread of a screw threaded member including a work guide having a threaded portion adapted to mate with the threads of a screw threaded member the thread of which is to be blocked, the work guide having a tool receiving recess opening outwardly thereof across the thread path of the threaded portion. Within the recess, means is provided for operatively mounting a cutting tool in the recess to cut in a zone intersecting a thread groove of the threaded portion of the work guide as developed across the opening of the tool receiving recess. The machine of the invention is preferably power driven and has means for operating the tool to cut in the aforementioned cutting zone.

The machine of the invention has a bed and a carriage slidable longitudinally on the bed. The carriage carries a machine head which in turn mounts the aforementioned work guide which is generally cylindrical in form and extends longitudinally of the bed. The tubular member, the thread of which is to be blocked, is mounted longitudinally of the machine bed and in alignment with the work guide. The cradle which carries the tubular member is constructed so that the tube may be rotated on its axis by a motor.

As regards the construction and arrangement whereby the reciprocating cutting tool can reciprocate freely and without binding on the return stroke against the continuously advancing edge of the cut made in the work on the preceding cutting stroke, the machine of the invention has means preferably including a spring constraining the cutting tool to move in a predetermined path on its cutting stroke while permitting the cutting tool to follow the continuously transversely advancing edge of the cut on its return stroke.

The invention will be described with greater particularity with reference to the accompanying drawings in which.

Figure 1:
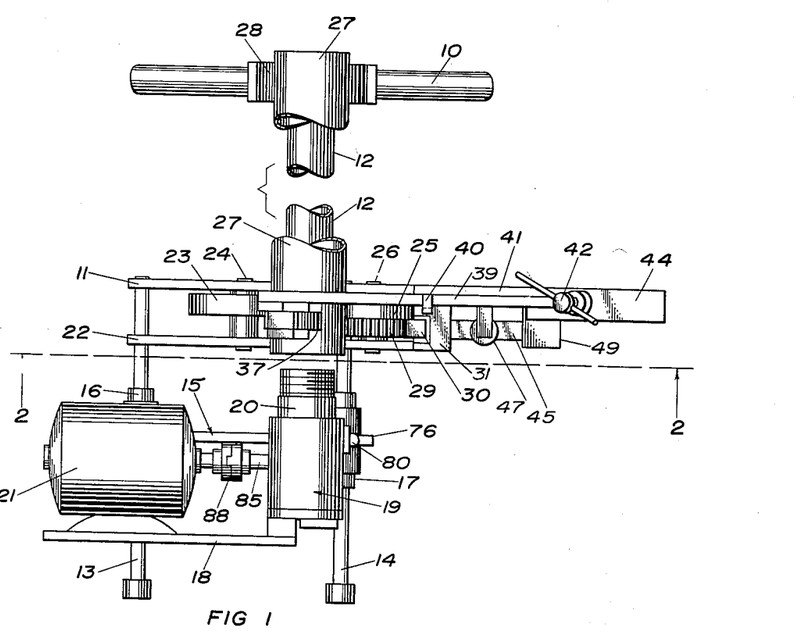
Fig. 1 is a plan view of a thread blocking machine embodying the principles of the invention.
Figure 2:
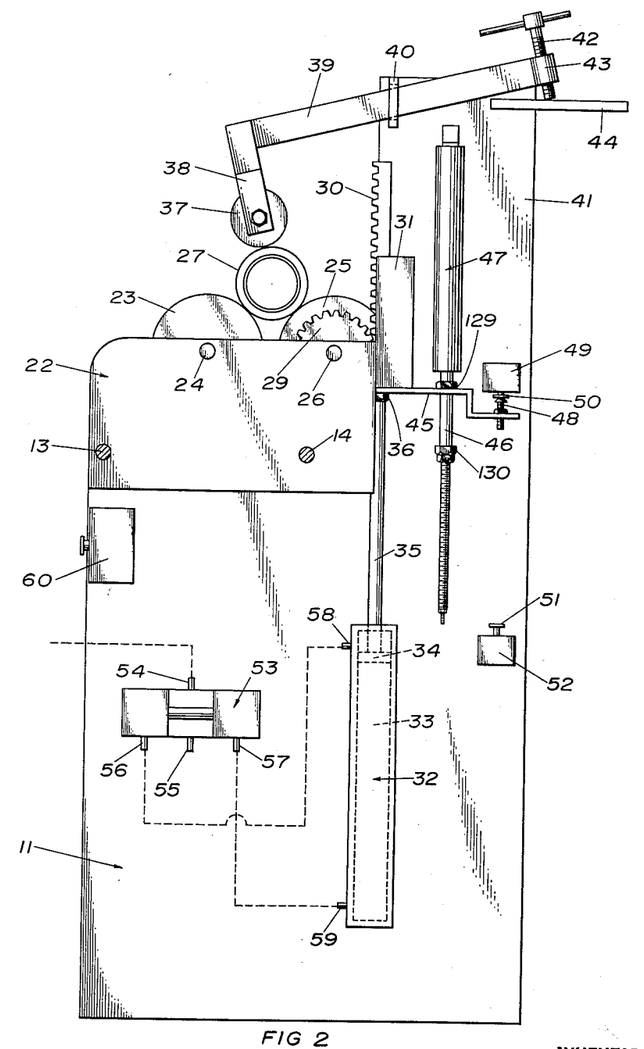
Fig. 2 is a transverse sectional view taken along the plane of the line 2—2 of Fig. 1 looking in the direction of the arrows.

Referring to the drawings, particularly to Figs. 1 and 2 thereof, the thread blocking machine shown has a bed including a pedestal 10 at one end and a vertical plate member 11 near the other end. These members rest on the floor and support a horizontal beam 12 extending therebetween and rigidly secured to the upright members. The bed includes a pair of horizontal parallel bars 13 and 14 that project from the side of the plate member 11 opposite to the beam 12. These bars are parallel to the beam 12. Mounted on the bars 13 and 14 for sliding movement longitudinally of the bed, is a carriage 15 having tubular sleeves 16 and 17 slidably fitted to the bars 13 and 14. The sleeves support the carriage frame 18 on which are mounted the machine head 19 carrying the work guide 20 and an electric motor 21 for driving the cutting mechanism to be more fully described hereinafter.

Mounted on the bars 13 and 14 in parallel fixed relation to the plate member 11, is a housing plate 22 which, with the opposed portion of the plate 11, provides a housing for some of the mechanism for rotating the work. Such work rotating mechanism includes an idler wheel 23 journaled between plates 11 and 22 on a shaft 24. A driven wheel 25 is similarly journaled in the plates 11 and 22 on a shaft 26. The wheel 25 lies in the same vertical plane as the wheel 23 and is spaced therefrom to provide part of a work cradle for supporting one end of a tubular work piece 27, the other end of which is supported in an arcuate cradle member 28. The shaft 26 of the driven wheel 25 carries a pinion 29 which is drivingly connected to the driven wheel so that the latter is rotated with the pinion. Meshing with the teeth of the pinion is a rack 30 vertically reciprocable in the rack guide 31 fixedly mounted between the plates 11 and 22. The rack is reciprocated in the guide by an air motor 32 having a cylinder 33 and a piston 34 from which extends a piston rod 35. The piston rod at its upper end is secured to the rack 30 and locked thereto with a nut 36.

The work piece 27 is pressed into engagement with the idler wheel 23 and the driven wheel 25 by pressure wheel 37 mounted for free rotation in a yoke 38 carried by an arm 39 that passes loosely through a slot in the ear 40 mounted on the extension 41 of the plate member 11. A manually operable screw 42 is threaded through the end 43 of the arm 39 and bears against a reaction plate 44 attached to the plate extension 41. As seen in Figs. 1 and 2, the pressure wheel 37 is pressed down upon the work piece 27, the screw 42 being screwed down against the plate 44 to fulcrum the pressure wheel against the work piece. It will further be seen that when the screw 42 is turned out, the arm 39 may be moved to the right to permit removal of the work piece 27 from the cradle.

There is attached to the rack 30 and piston rod 35 for movement therewith a laterally extending control arm 45. The control arm is secured to the piston rod 46 of a hydraulic damping device 47. This damping device 47 is of known construction and includes a piston within a cylinder filled with hydraulic fluid, the piston being connected to the piston rod 46 and having a variable orifice therein so that the rate of travel of the piston may be regulated by varying the opening of the orifice. The control arm 45 carries an adjustable switch actuating screw 48 that maintains the motor switch 49 in open position when the rack is fully raised and the switch button 50 is pressed into the switch by the screw. On downward travel of the rack and control arm, the switch actuating screw separates from the switch button 50 allowing the switch to close. When the rack 30 reaches the lower limit of its travel, the switch actuating screw 48 contacts the button 51 of switch 52 which reverses movement of the air motor 32 to return the rack to the starting position shown in Fig. 2.

The air motor is under control of a solenoid valve 53 having an air inlet port 54 and an air exhaust port 55 together with distributing ports 56 and 57. As indicated by dotted lines in Fig. 2, the distributing port 56 is connected to the upper air port 58 of the air motor, and the distributing port 57 is connected to the lower air port 59 of the air motor. The switch 52 operates the solenoid valve 53 when it is closed by the control arm 45 to send air from the valve 53 to the lower port 59 to return the piston 34 and rack 30 to their upper positions. As will be explained more fully hereinafter, the starting switch 60 when closed operates the solenoid valve 53 to reverse the position of the valve to send air to the upper port 58 of the air motor to begin the cycle of operation.

Figure 3:
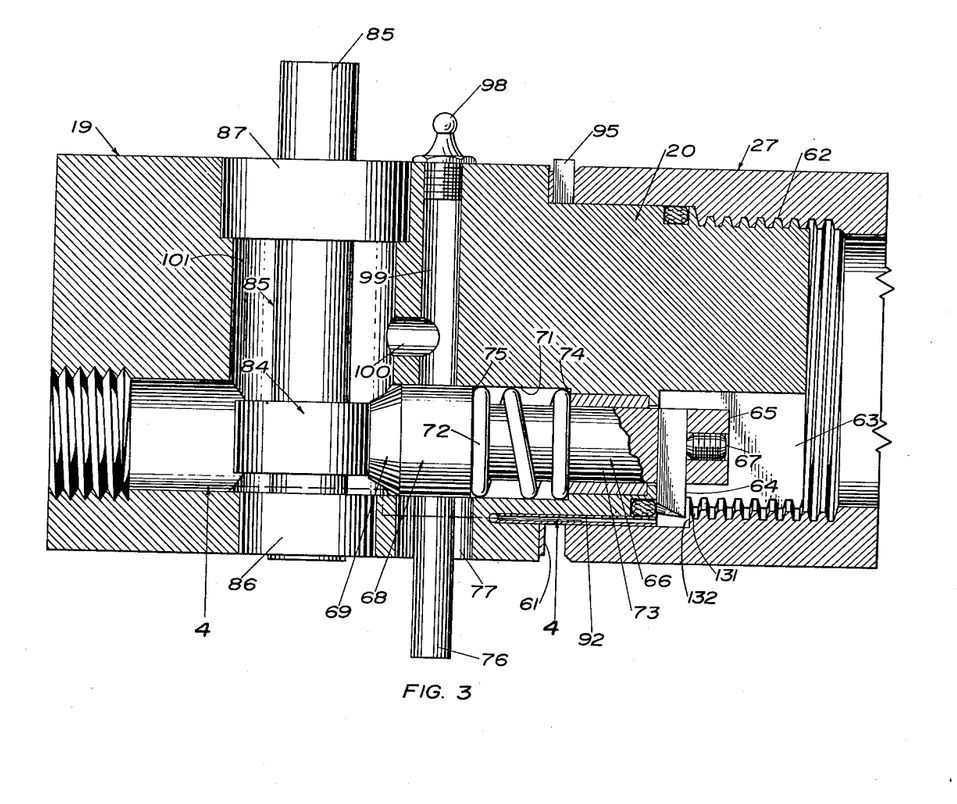
Fig. 3 is an enlarged horizontal sectional view taken on the line 3—3 of Fig. 5 of the machine head and work guide incorporated in the machine of Figs. 1 and 2, the end of a tubular work piece being shown threaded to the work guide.
Figure 4:
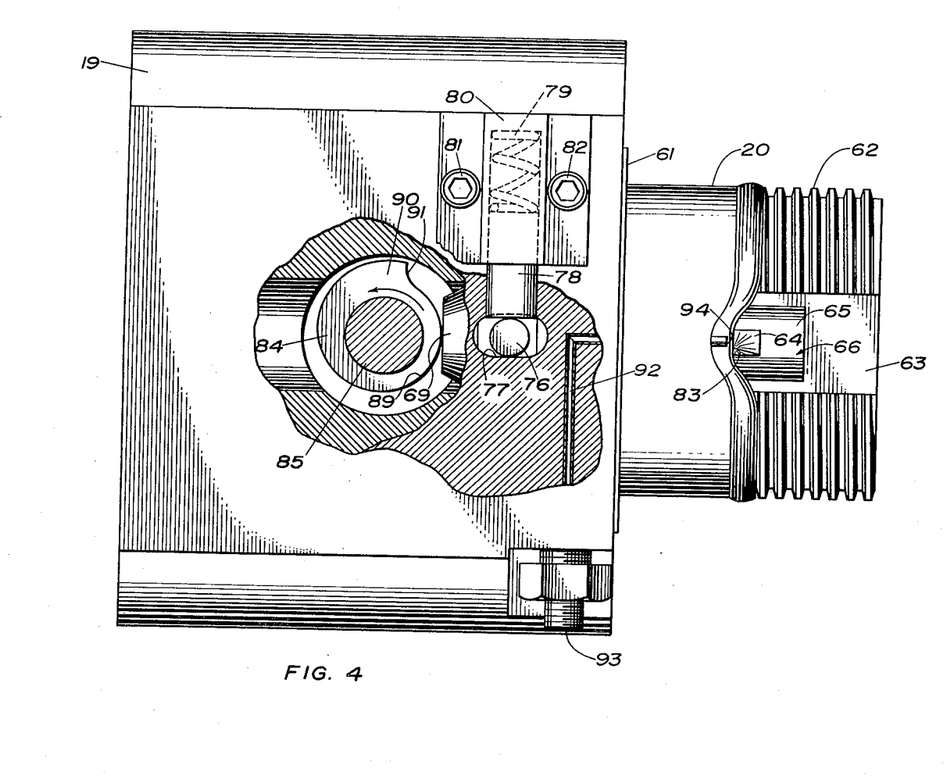
Fig. 4 is a side view of the machine head and work guide of Fig. 3, parts being broken away along the line 4—4 of Fig. 3 to expose interior construction.
Figure 5:
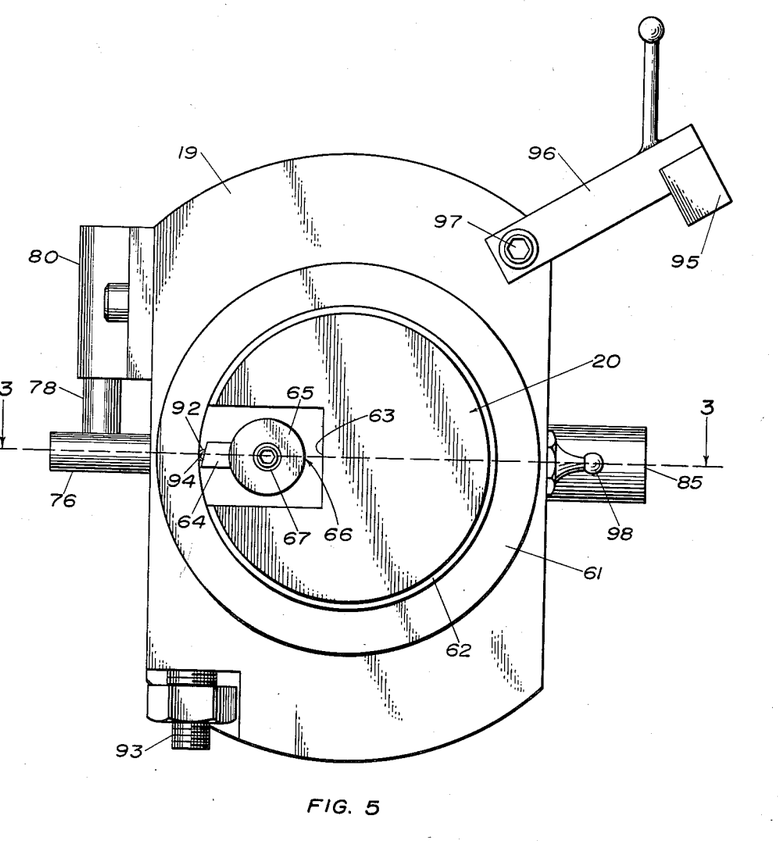
Fig. 5 is a front view of the machine head and work guide of Figs. 3 and 4.

Referring now to Figs. 3, 4 and 5 showing in enlarged detail the machine head 19 and the work guide 20, the work guide 20 is generally cylindrical and its axis extends longitudinally of the machine toward the pedestal end thereof. The work guide is integral with or affixed to the machine head 19 at its inner end and has a stop ring 61 encircling the base. The outer end of the work guide is threaded as shown at 62 for a substantial distance toward the base of the work guide. In the particular form of the invention shown in the drawings, the thread 62 is a right hand Acme thread, but of course the invention is not limited to this type of thread. The thread is adapted to mate with the thread of the work piece to be blocked. A recess 63 is formed in one side of the work guide and this recess provides space in which the cutting tool 64 operates to block the thread of the work piece. As shown, the recess 63 opens outwardly through the side of the work guide and through the threads 62 thereof, thus forming a window that opens through the thread 62. The cutting tool 64 is mounted in the end 65 of a tool actuator 66, the tool being releasably held in a bore of the tool actuator by a set screw 67. The tool actuator is reciprocably mounted in the tool guide and machine head for movement longitudinally of the machine. The inner end of the tool actuator has an enlarged portion 68 tapering to a truncated conical cam follower 69 that rides on the cam 84. The enlarged portion 68 of the tool actuator slides in a bore 71 in the machine head and work guide. The tool actuator is urged into engagement with the cam 84 by a compression return spring 72 surrounding the shank 73 and acting between the shoulder 74 in the bore 71 of the machine head and work guide and shoulder 75 formed at the forward end of the enlarged portion 68 of the tool actuator.

Extending sidewardly from the enlarged portion 68 of the tool actuator is a pin 76 that rides in a longitudinal slot 77 in the side wall of the machine head. The pin 76 is urged toward the bottom of the slot 77 by a plunger 78 that presses against the top of the pin 76 under urgence of a spring 79 contained in a plunger housing 80 secured to the side of the machine head by screws 81 and 82. The pin 76 coacting with the bottom of slot 77 and plunger 78 assures proper tool action during reciprocation.

During the forward or cutting stroke of the tool actuator, the plunger 78 presses the pin 76 downwardly against the bottom of the slot 77. The work is continuously advancing through the cutting zone in a direction transverse to the direction of reciprocation of the cutting tool and tends to drag the tool with it in a clockwise direction as seen in Fig. 5. However, the force exerted by spring 79 in opposition is sufficient to hold the pin 76 against the bottom of slot 77 during the cutting stroke as metal is removed from the thread being blocked. Also, as seen in Fig. 4, the tool 64 is relieved at 83 so that the upwardly advancing thread does not exert undue pressure on the bottom of the tool.

On the backward or return stroke of the tool actuator, the continuously advancing work exerts strong forces on the tool 64 urging it to rotate in a clockwise direction as seen in Fig. 5. It will be understood that the tool cuts only on the forward stroke and does not cut on the return stroke. These forces actually move the tool in the clockwise direction as seen in Fig. 5 and such movement is permitted within the limits of the height of the slot 77. As seen in Fig. 4, the height of the slot 77 is greater than the diameter of the pin 76 and the pin may move upwardly in the slot as the tool is swung upwardly by the advancing work, such movement being allowed by upward movement of plunger 78 and yielding of spring 79. Thus, on the return stroke, the bottom face 83 and cutting edge of the tool follow the continuously advancing edge of the cut previously made in the thread on the forward stroke of the tool. When the tool has reached its full rearward position, the forward or cutting edge of the tool has cleared the thread being blocked, and the spring 79 and plunger 78 return the pin 76 to the bottom of the slot 77 in preparation for the next cutting stroke.

The tool actuator driving cam 84 is fixed to a shaft 85 journaled in bearings 86 and 87 carried in the side walls of the machine head. As seen in Fig. 1, the shaft 85 is driven by the electric motor 21 through a coupling 88. Cam 84, as best seen in Fig. 4, has a cylindrical portion 89 merging gradually into a rise 90 and abruptly returning at 91 to the cylindrical portion 89. The cam rotates in a counter clockwise direction as indicated by the arrow in Fig. 4 to impart relatively slow forward movement to the tool actuator 66 with quick return under urgence of spring 72.

Compressed air may be passed through the channel 92 formed in the machine head and work guide and leading from an air inlet connection 93 to a discharge port 94 from which a blast of air is directed over the cutting zone and tool 64 for the purpose of blowing away chips produced in the machining operation.

A gauge block 95 (Fig. 5) is attached to a gauge block arm 96 pivoted to the machine head 19 at 97. The gauge block may be swung into the position shown in Fig. 3 to establish the starting position of the work piece 27 preliminary to the blocking operation. Before the machine is started, the gauge block 95 is swung out of its position between the end of the work piece 27 and the ring 61.

There is provided a grease fitting 98 through which the moving parts of the machine head are lubricated. Lubricant is introduced through the grease fitting and flows through the grease channels 99 and 100 to the chamber 101 housing the shaft and cam. From this chamber, lubricant finds its way around the tool actuator 66 to lubricate the sliding surfaces thereof.

Figure 6:
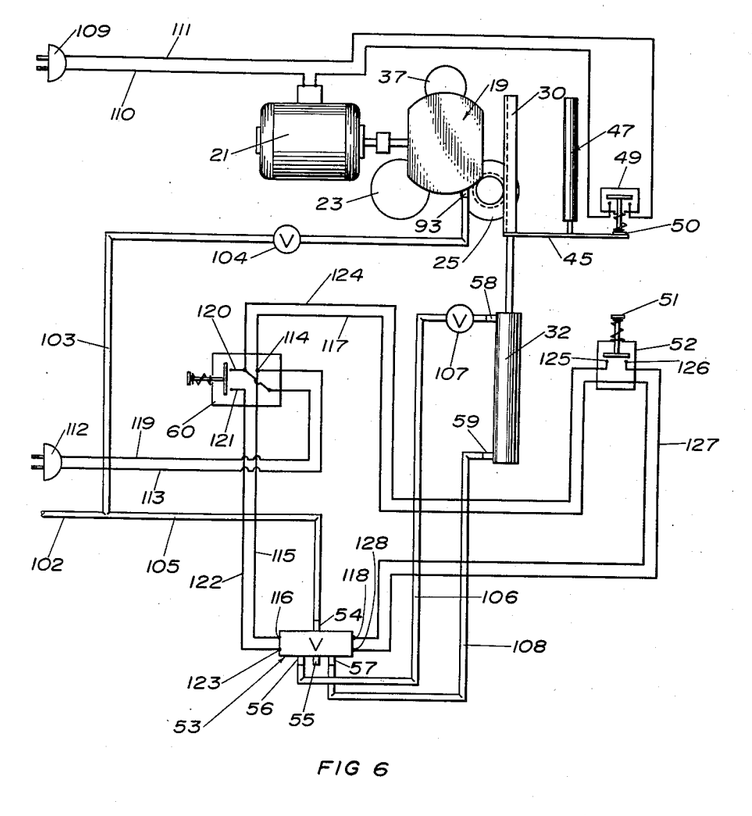
Fig. 6 is a diagrammatic view of the electrical circuitry and compressed air system of the machine.

Turning now to Fig. 6, which is a diagrammatic view of the electrical and air systems of the thread blocking machine, a compressed air supply line is shown at 102. One branch 103 of the air supply line leads through the manual control valve 104 to the compressed air inlet connection 93 on the machine head and supplies air for blowing away chips produced by machining.

The other branch 105 of the compressed air supply line is connected to the air inlet connection 54 of the distributing valve 53. The distributing port 56 of the distributing valve is connected by pipe 106 to the upper air inlet port 58 of the air motor 32, a valve 107 being intercalated in the line for manual control of air flow. The distributing port 57 of the distributing valve 53 is connected by a pipe 108 to the lower air inlet port 59 of the air motor 32. The exhaust port of the distributing valve is designated 55.

By means of a standard electrical plug 109 the motor 21 is connected to a current supply. One wire 110 leads directly from the plug 103 to one terminal of the motor, and the other wire 111 is connected to the other terminal of the motor through the switch 49. Thus, when the switch 49 is open the motor 21 is de-energized. Upon movement of the control arm 45 downwardly, switch 49 is closed and the motor 21 is energized to drive the cutting tool.

Another electrical plug 112 is connectable to the current supply to provide current for operating the distributing valve 53. One wire 113 branches at the junction 114 to connect through branch wire 115 to the terminal 116 of the left side of the distributing valve 53. The other branch wire 117 connects the junction 114 to the terminal 118 of the right side of the distributing valve. The second wire 119 from the plug 112 is connected to a terminal 120 of the switch 60, the other terminal 121 of which is connected by wire 122 to the terminal 123 of the left side of the distributing valve. Thus, when the switch 60 is closed, the left solenoid of the distributing valve is energized to draw the valve slide to the left placing the upper end of the cylinder of air motor 32 in communication with the compressed air supply from the line 102, thus driving the piston of the air motor 32 downwardly in its cylinder. The valve 53 is so designed that the switch 60 need be closed only momentarily to draw the slide to the left; the slide then remains in its left hand position until moved therefrom. The distributing valve with the slide in its left hand position places the lower end of the cylinder of air motor 32 in communication through the pipe 108 with the exhaust port 55 and air is exhausted from the bottom of the cylinder through this port as the piston is driven downwardly.

Wire 119 from plug 112 is connected through its extension 124 to one terminal 125 of switch 52, the other terminal 126 of the switch being connected through wire 127 to the terminal 128 of the right hand side of the distributing valve 53. When switch 52 is closed, as it is when the piston of the air motor reaches its lowermost position by pressure of the control arm 45, the right hand side of the distributing valve is energized to draw the valve slide to the right. This movement of the valve slide places the valve parts in position to connect the lower port 59 of the air motor 32 with the compressed air supply from the line 102 and to place the upper port 58 of the cylinder in communication with the exhaust port 55. Air pressure then moves the piston in an upward direction until it reaches its upper limit when the switch 49 is opened and the motor 21 is de-energized.

In operation, the electrical plugs 109 and 112 are connected to a source of current and the compressed air supply line 102 is connected to a source of compressed air. An internally threaded work piece such as the tubular gun barrel 27 is laid in the cradle with the end to be machined close to the work guide 20 and the other end resting in the cradle member 28. The gauge block 95 is swung into the position shown in Fig. 3 and the work piece is manually threaded upon the work guide 20 to a position flush with the gauge block. The gauge block is then swung out from between the end of the gun barrel 27 and the stop ring 61. The pressure wheel 37 is placed in contact with the upper part of the work piece 27 and pressed down on the work piece by turning the screw 42 against the reaction plate 44.

The manually operated starting switch 60 is momentarily closed to operate the distributing valve 53 to cause the air motor 32 to draw the rack 30 downwardly. The driven wheel 25 is thereby rotated in a clockwise direction as seen in Fig. 2 and this motion is frictionally imparted to the work piece 27 to rotate the latter in a counter clockwise direction. This rotary motion of the work piece advances the terminal end of the thread to be blocked into the cutting zone of cutting tool 64 while at the same time, owing to screw action, the work guide 20 is drawn into the bore of the tube. This motion is permitted by corresponding sliding motion of the carriage 15 on the bars 13 and 14. During the first part of downward movement of the rack 30, the switch 49 is closed and the motor 21 is energized to drive the cutting tool. The cutting tool continues to operate through the cycle until the control arm returns to its upper position to open the switch 49 and de-energize the motor.

When the rack reaches the bottom of its travel, the terminal end of the thread has been blocked for a sufficient length and switch 52 is closed by the control arm 45 to reverse movement of the parts and to return them to their starting positions.

Referring to Fig. 2, it will be observed that the control arm 45 may slide on the piston rod 46 of the hydraulic damping device 47 between an upper limit nut 129 and a lower limit nut 130. Thus, initial downward movement of the rack is quite rapid until the control arm strikes the lower limit nut 130 and provides for quick energization of the cutter driving motor 21; thereafter, the damping device 47 exerts a slowing effect on the downward movement of the control arm 45 and the rack 30 so that the blocking of the thread is accomplished at an appropriate lower speed of advancement of the thread into the cutting zone.

It will be seen, from a consideration of Figs. 3, 4 and 5, that the depth to which the terminal end of the thread is blocked may be regulated by the extent to which the cutting edge of the tool 64 extends laterally of the tool actuator. The tool position is adjusted as desired and the tool is retained in such position by set screw 67. The stroke of the tool actuator 66 is determined by the height of the cam rise 90 above the cylindrical section 89 of the cam 84. Forward movement of the tool actuator 66 is definitely limited by abutment of the pin 76 with the forward end of slot 77. The stroke of the tool holder is arranged to be substantially equal to the pitch of the thread to be blocked and the limits of the stroke are arranged with relation to the work guide so that the cutting zone extends in a longitudinal direction from about the center of the groove 131 of the work piece 27 through the thread portion 132 for a distance substantially equal to the pitch of the thread. With this arrangement, there is no danger of the tool cutting into an adjacent turn of the thread and the blocking zone is limited to a zone through which the terminal end of the thread is advanced.

After the thread blocking machine has operated through the machining cycle as described hereinbefore, the screw 42 is released and the pressure wheel 37 is moved to one side. The work piece is then manually unscrewed from the work guide and removed from the machine. The machine is now ready to begin a new cycle of operation.

Figures 7, 8, 9:
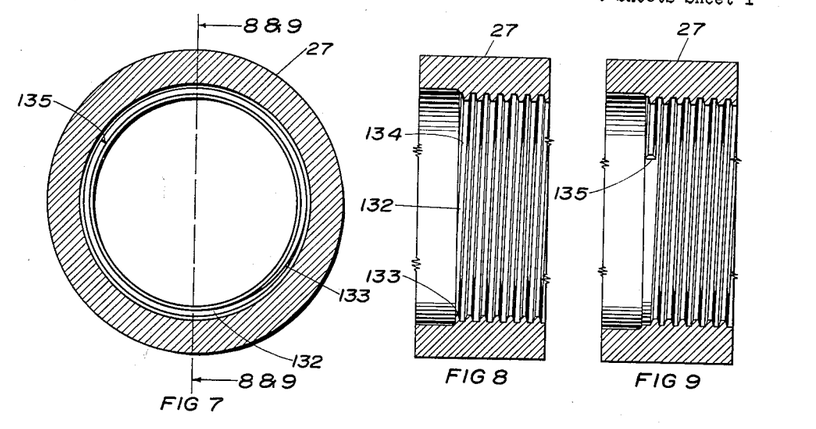
Fig. 7 is an axial view of an internally threaded tubular work piece.
Fig. 8 is a sectional view taken along the plane of line 8 and 9—8 and 9 of Fig. 7 showing the thread prior to blocking.
Fig. 9 is a view similar to Fig. 8 showing the work piece after performance of the thread blocking operation using the machine of the invention.

Figs. 7, 8 and 9, to which reference is now made, illustrate the end of a work piece both before and after the blocking operation is performed on the machine of the present invention. In Fig. 8, the terminal end of the thread to be blocked is designated by the reference numeral 132. It has an extremely thin tip 133 which flares in approximately one-half a turn of the thread to full thread width. The full width of the thread is achieved about at the point marked 134 in Fig. 8.

Fig. 9 shows the work piece 27 subsequent to the blocking operation. The squared end of the thread is shown at 135 and it will be evident that the thread at this point is of full width, the tapering terminal end thereof having been removed in the blocking operation.

From the foregoing description it will be evident that various modifications in the machine of the present invention will occur to persons merely skilled in the art. For example, although the illustrative embodiment of the invention utilizes a reciprocating cutting tool, it will be apparent that a rotary cutting tool mounted to cut in the direction of advancement of the thread to be blocked may be used instead. Also, the principles of the invention may be utilized in the blocking of an external thread as distinguished from the internal thread of the gun cylinder used by way of illustration.

I claim:

1. A machine for blocking the thread of a screw threaded member comprising: a work guide having a threaded portion adapted to mate with the threads of a screw threaded member the thread of which is to be blocked, said work guide having a tool receiving recess opening outwardly thereof across the thread path of said threaded portion; means within said recess for operatively mounting a cutting tool in said recess to cut in a zone transversely intersecting a preselected restricted portion of a thread groove of said threaded portion as developed across the opening of said tool receiving recess; and means for operating the tool to cut in said zone.

2. A machine for blocking the thread of an internally helically threaded member comprising: a machine head; a cylindrical work guide on said machine head having an externally helically threaded portion adapted to mate with the threads of an internally helically threaded member the thread of which is to be blocked, said work guide having a tool receiving recess opening outwardly thereof across the thread path of said threaded portion; means within said recess for mounting a cutting tool in said recess to cut in a zone transversely intersecting a preselected restricted portion of a thread groove of said externally threaded portion as developed across the opening of said tool receiving recess; power driven means for operating a tool in said mounting means to cut in said zone; and power driven means for screwing said helically threaded member on the threaded portion of said work guide to advance the thread of said member into said cutting zone.

3. A machine for blocking the terminal end of the thread of an internally helically threaded member comprising: a machine head; a cylindrical work guide extending outwardly from said machine head having an externally helically threaded portion adjacent the outer end thereof adapted to mate with the threads of an internally helically threaded member the terminal end of the thread of which is to be blocked, said work guide having a recess in which a cutting tool is adapted to operate, said recess opening outwardly through the threaded portion of said work guide; means within said recess for operatively mounting a cutting tool in said recess to cut in a zone transversely intersecting a preselected restricted portion of a thread groove of said externally threaded portion as developed across the opening of said recess; power driven means for operating a tool in said mounting means to cut in said zone; and power driven means for screwing said helically threaded member on the threaded portion of said work guide to advance the thread of said member into said cutting zone.

4. A machine for blocking the terminal end of the thread of an internally helically threaded member comprising: a machine head; a cylindrical work guide extending outwardly from said machine head having an externally helically threaded portion adjacent the outer end thereof adapted to mate with the threads of an internally helically threaded member the terminal end of the thread of which is to be blocked, said work guide having a recess in which a cutting tool is adapted to operate, said recess opening outwardly through the threaded portion of said work guide; a tool actuator mounted in said work guide for reciprocation substantially parallel to the axis of said externally threaded portion of the work guide, said tool actuator having an end extending into said recess; cutting tool holding means on said tool actuator within said recess for positioning a cutting tool to cut in a zone intersecting a thread groove of said externally threaded portion as developed across the opening of said recess; and means carried by said machine head and operatively connected to said tool actuator for reciprocating the latter through a stroke substantially equal to the pitch of said externally threaded portion.

5. A machine for blocking the terminal end of the thread of an internally helically threaded tubular member comprising: a bed; a carriage slidable longitudinally on said bed; a machine head mounted on said carriage; a cylindrical work guide extending outwardly from said machine head longitudinally of said bed, said work guide having an externally helically threaded portion adjacent the outer end thereof adapted to mate with the threads of an internally helically threaded tubular member the terminal end of the thread of which is to be blocked, said work guide having a recess in which a cutting tool is adapted to operate, said recess opening outwardly through the threaded portion of said work guide; means within said recess for operatively mounting a cutting tool in said recess to cut in a zone transversely intersecting a thread groove of said externally threaded portion as developed across the opening of said recess; motor means on said carriage for operating a tool in said mounting means to cut in said zone; and means on said bed for supporting and rotating an internally helically threaded tubular member with its internal threads mated with the externally threaded portion of said work guide, whereby to draw said work guide into said tubular member and advance the terminal end of the internal thread of said tubular member through said cutting zone.

6. A machine for blocking the terminal end of the thread of an internally helically threaded member comprising: a machine head; a cylindrical work guide extending outwardly from said machine head having an externally helically threaded portion adjacent the outer end thereof adapted to mate with the threads of an internally helically threaded member the terminal end of the thread of which is to be blocked, said work guide having a recess in which a cutting tool is adapted to operate, said recess opening outwardly through the threaded portion of said work guide; a tool actuator mounted in said machine head and work guide for reciprocation substantially parallel to the axis of said externally threaded portion of the work guide, said tool actuator being mounted also for rotational movement about its longitudinal axis; a pin extending laterally from said tool actuator and sliding in a longitudinal slot provided in said machine head, said slot being wider than said pin to allow limited rotational movement of said tool actuator; spring pressed means normally urging said pin to one side of said slot in the direction of rotation of said tool actuator; said tool actuator having an end extending into said recess; cutting tool holding means in said tool actuator within said recess for positioning a cutting tool to cut in a zone intersecting a thread groove of said externally threaded portion as developed across the opening of said recess; and means carried by said machine head and operatively connected to said tool actuator for reciprocating the latter through a stroke substantially equal to the pitch of said externally threaded portion.

7. In a machine tool having a continuously reciprocating cutting tool and wherein the work is continuously rotated into the cutting zone defined by the reciprocating cutting tool in a direction transverse to the direction of reciprocation of the cutting tool, the improvement which comprises: a tool actuator; means on said tool actuator for holding a cutting tool; means mounting said tool actuator for reciprocation transversely of the direction of rotational advancement of the work into the cutting zone; power means for continuously reciprocating said tool actuator through cutting and return strokes; means including a spring constraining the tool to move in a predetermined path on its cutting stroke and yieldingly biasing the cutting tool to follow the continuously transversely advancing edge of the cut on its return stroke.

References Cited in the file of this patent

UNITED STATES PATENTS

| | | |
|---|---|---|
| 789,535 | Glocker | May 9, 1905 |
| 2,058,360 | Schmidt | Oct. 20, 1936 |
| 2,365,549 | Haynes | Dec. 19, 1944 |
| 2,479,660 | Wright | Aug. 23, 1949 |
| 2,541,306 | Taylor | Feb. 13, 1951 |

FOREIGN PATENTS

| | | |
|---|---|---|
| 724,550 | Great Britain | Feb. 23, 1955 |